(12) United States Patent
Sutou et al.

(10) Patent No.: US 10,308,832 B2
(45) Date of Patent: Jun. 4, 2019

(54) HYDRAULIC TRANSFER FILM AND MOLDED PRODUCT DECORATED USING SAME

(71) Applicant: DAI NIPPON PRINTING CO., LTD., Tokyo (JP)

(72) Inventors: Masatoshi Sutou, Tokyo (JP); Takashi Iizuka, Tokyo (JP); Takami Sendai, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 686 days.

(21) Appl. No.: 14/780,889

(22) PCT Filed: Mar. 26, 2014

(86) PCT No.: PCT/JP2014/058488
§ 371 (c)(1),
(2) Date: Sep. 28, 2015

(87) PCT Pub. No.: WO2014/157316
PCT Pub. Date: Oct. 2, 2014

(65) Prior Publication Data
US 2016/0068705 A1 Mar. 10, 2016

(30) Foreign Application Priority Data

Mar. 28, 2013 (JP) .................................. 2013-070633
Mar. 28, 2013 (JP) .................................. 2013-070635

(51) Int. Cl.
*B44C 1/175* (2006.01)
*B44F 9/00* (2006.01)
(Continued)

(52) U.S. Cl.
CPC .............. *C09D 175/04* (2013.01); *B32B 3/30* (2013.01); *B32B 27/08* (2013.01); *B32B 27/18* (2013.01);
(Continued)

(58) Field of Classification Search
None
See application file for complete search history.

(56) References Cited

U.S. PATENT DOCUMENTS

2002/0192378 A1* 12/2002 Hori ..................... B44C 1/105
427/256
2007/0042163 A1* 2/2007 Ariga ..................... B44C 1/175
428/195.1
(Continued)

FOREIGN PATENT DOCUMENTS

JP 2001-328398 A 11/2001
JP 2005-231340 A 9/2005
(Continued)

OTHER PUBLICATIONS

Machine translation of JP-2007098608-A JP-2009214420-A, and JP2001-328398 (Year: 2018).*
(Continued)

*Primary Examiner* — Barbara J Musser
(74) *Attorney, Agent, or Firm* — Locke Lord LLP (57) ABSTRACT

There is provided a hydraulic transfer film which consists of a laminate that has, on a water-soluble film, both an extension-inhibiting resin layer and a luster ink layer containing a luster pigment and a binder resin, wherein: the laminate has protrusions and recesses on the surface opposite to the water-soluble film; and the resin forming the extension-inhibiting resin layer contains a resin (A) having a glass transition temperature of 80° C. or higher. There is also provided a process for manufacturing the same; and a process for producing a decorated molded product, using the transfer film.

16 Claims, 2 Drawing Sheets

(51) Int. Cl.
    *C09D 175/04* (2006.01)
    *B32B 27/08* (2006.01)
    *B32B 27/18* (2006.01)
    *B32B 27/30* (2006.01)
    *B32B 3/30* (2006.01)
    *B44C 1/24* (2006.01)
    *B44F 9/02* (2006.01)
    *B44F 9/10* (2006.01)
    *B44F 9/12* (2006.01)
    *C09D 11/00* (2014.01)
    *C09D 101/18* (2006.01)
    *C09D 131/04* (2006.01)
    *C09D 133/00* (2006.01)
    *C09D 167/02* (2006.01)
    *C09D 11/10* (2014.01)
    *C09D 11/50* (2014.01)
    *C08L 75/04* (2006.01)

(52) U.S. Cl.
    CPC .......... *B32B 27/304* (2013.01); *B32B 27/306* (2013.01); *B32B 27/308* (2013.01); *B44C 1/175* (2013.01); *B44C 1/1752* (2013.01); *B44C 1/1758* (2013.01); *B44C 1/24* (2013.01); *B44F 9/02* (2013.01); *B44F 9/10* (2013.01); *B44F 9/12* (2013.01); *C08L 75/04* (2013.01); *C09D 11/00* (2013.01); *C09D 11/10* (2013.01); *C09D 11/50* (2013.01); *C09D 101/18* (2013.01); *C09D 131/04* (2013.01); *C09D 133/00* (2013.01); *C09D 167/02* (2013.01); *B32B 2307/4026* (2013.01); *B32B 2451/00* (2013.01)

(56) References Cited

U.S. PATENT DOCUMENTS

| | | | |
|---|---|---|---|
| 2016/0198577 A1* | 7/2016 | Janssen | H05K 3/007 427/99.5 |
| 2017/0267006 A1* | 9/2017 | Ikeda | B32B 27/00 |

FOREIGN PATENT DOCUMENTS

| | | | |
|---|---|---|---|
| JP | 2005-246960 A | | 9/2005 |
| JP | 2006-051672 A | | 2/2006 |
| JP | 2007-054998 A | | 3/2007 |
| JP | 2007098608 A | * | 4/2007 |
| JP | 2008-158141 A | | 7/2008 |
| JP | 2009214420 A | * | 9/2009 |
| JP | 2009-234187 A | | 10/2009 |
| JP | 2009-241613 A | | 10/2009 |
| JP | 2013-897 A | | 1/2013 |

OTHER PUBLICATIONS

International Search Report dated Jun. 24, 2014, issued in counterpart Application No. PCT/JP2014/058488 (2 pages).

* cited by examiner

HYDRAULIC TRANSFER FILM AND MOLDED PRODUCT DECORATED USING SAME

TECHNICAL FIELD

The present invention relates to a hydraulic transfer film, and a decorative molded article obtained using the hydraulic transfer film.

BACKGROUND ART

Molded articles, the surface of which is decorated with a woodgrain tone, a metallic tone (metallic luster) or the like, are used in building materials, automobile interior components, home electric appliances, OA equipment or the like. Many of these molded articles have a complicated three-dimensional shape, and studies have been heretofore made on a method for easily and conveniently decorating the complicatedly-shaped, molded article with high design property.

As such a decoration method, a hydraulic transfer method using a hydraulic pressure is known, and the hydraulic transfer method is known to be a curved surface decoration method that is excellent in transfer processability to a three-dimensional surface, "deepness" of clear coatability etc., and design property which ensure that a high-quality pattern can be presented.

Meanwhile, in recent years, consumers have become demanding on design property, and particularly in metallic-tone (metallic luster) decoration, not only high brightness but also luxuriousness have been required. There has been proposed a technique for solving these problems using, for example, a layer that exhibits brightness and an irregularity shape that is formed by embossing, specifically a hydraulic transfer sheet including a cellulose nitrate/alkyd-based transparent resin layer on a water-soluble film, and a vapor deposition metal layer on the transparent resin layer, wherein the transparent resin layer is embossed between the vapor deposition metal layer and the transparent resin layer (Patent Document 1).

Use of the hydraulic transfer sheet described in Patent Document 1 makes it possible to perform curved surface transfer because at the time when the sheet extends during hydraulic transfer, fine cracks (cracking) are generated in the vapor deposition metal layer, so that the vapor deposition metal layer also extends. However, there is the problem that design property significantly vary depending on a size of the crack width of cracks generated in the vapor deposition metal layer during hydraulic transfer, and when the crack width is large, luxuriousness of the pattern is impaired.

PRIOR ART DOCUMENT

Patent Document

Patent Document 1: Japanese Patent Laid-open Publication No. 2001-328398

SUMMARY OF THE INVENTION

Problems to be Solved by the Invention

Thus, an attempt was made to replace the vapor deposition metal layer by a luster ink layer and provide the luster ink layer with an irregularity shape, but the luster ink layer excessively extended during hydraulic transfer, so that the irregularity impression disappeared, and therefore design property with excellent brightness and luxuriousness could not be obtained. Further, for retaining the irregularity shape of the luster ink layer to prevent disappearance of the irregularity impression, an attempt was made to suppress excessive extension of the luster ink layer by providing a resin layer between a water-soluble film as a base material of a hydraulic transfer film and the luster ink layer. However, depending on a type of resin that forms the resin layer, the luster ink layer was peeled during production of a hydraulic transfer film, or the like, so that a proper irregularity shape could not be formed on the luster ink layer. Thus, brightness and luxuriousness were impaired in some cases.

In view of these circumstances, an object of the present invention is to provide a hydraulic transfer film which includes a luster ink layer, has an irregularity shape properly formed during production of the hydraulic transfer film, and is capable of imparting design property with excellent brightness and luxuriousness to a resin molded article; a method for producing the hydraulic transfer film; and a decorative molded article obtained using the hydraulic transfer film.

Means for Solving the Problem

The present inventors have extensively conducted studies for achieving the above-mentioned object, and resultantly found that the object can be achieved by the invention described below. That is, the present invention provides a hydraulic transfer film as described below, a method for producing the hydraulic transfer film, and a decorative molded article obtained using the hydraulic transfer film.

Item 1. A hydraulic transfer film comprising a laminated body including on a water-soluble film an extension control resin layer, and a luster ink layer containing a luster pigment and a binder resin, wherein the hydraulic transfer film has an irregularity shape on a surface of the laminated body on a side opposite to the water-soluble film, and a resin that forms the extension control resin layer contains a resin A having a glass transition temperature of 80° C. or higher.

Item 2. The hydraulic transfer film according to item 1, including the extension control resin layer and the luster ink layer in this order on the water-soluble film.

Item 3. The hydraulic transfer film according to item 1, including the luster ink layer and the extension control resin layer in this order on the water-soluble film.

Item 4. The hydraulic transfer film according to any one of items 1 to 3, wherein the glass transition temperature of the resin A is 80 to 145° C.

Item 5. The hydraulic transfer film according to any one of items 1 to 4, wherein the resin A is a water-insoluble resin.

Item 6. The hydraulic transfer film according to any one of items 1 to 5, wherein the resin A is at least one selected from an acrylic resin, an acrylic polyol resin, a nitrocellulose resin and a vinyl chloride-vinyl acetate copolymer resin.

Item 7. The hydraulic transfer film according to any one of items 1 to 6, wherein a content of the resin A in the resin that forms the extension control resin layer is 50% by mass or more.

Item 8. The hydraulic transfer film according to any one of items 1 to 7, wherein the binder resin that forms the luster ink layer is a mixture of a nitrocellulose resin and an alkyd resin.

Item 9. The hydraulic transfer film according to item 3, wherein the extension control layer has a multilayer structure of two or more layers.

Item 10. The hydraulic transfer film according to item 9, wherein a resin that forms an extension control resin layer located at the outermost surface among the extension control layers in the multilayer structure includes an alkyd resin and a nitrocellulose resin as the resin A.

Item 11. The hydraulic transfer film according to item 9 or 10, wherein among the extension control layers in the multilayer structure, extension control resin layers other than the extension control layer located at the outermost surface contain an acrylic polyol resin as the resin A.

Item 12. The hydraulic transfer film according to item 2, further including a second extension control resin layer, which contains the resin A, on the luster ink layer on a side opposite to the extension control resin layer.

Item 13. The hydraulic transfer film according to item 12, wherein the second extension control resin layer contains an alkyd resin and a nitrocellulose resin as the resin A.

Item 14. A method for producing a hydraulic transfer film, the method comprising the following steps in order:

step (1): a step of laminating on a water-soluble film an extension control resin layer formed of a resin composition containing a resin A having a glass transition temperature of 80° C. or higher, and a luster ink layer containing, a luster pigment and a binder resin; and step (2): a step of performing embossing from a surface of the laminated body on a side opposite to the water-soluble film.

Item 15. A method for producing a decorative molded article, the method comprising the following steps (a) to (c) in order:

step (a): an activator applying step of applying, before or after floating the hydraulic transfer film according to any one of claims 1 to 13 on a water surface with the water-soluble film facing the water surface, an activator composition to a surface of the hydraulic transfer film on a side opposite to the water-soluble film;

step (b): a step of pressing a transfer object against the activator composition-applied surface of the hydraulic transfer film subjected to the step (a) and floated on the water surface, and adhering the hydraulic transfer film to a transfer surface of the transfer object by means of a hydraulic pressure; and step (c): a film removing step of removing the water-soluble film adhered to the transfer surface of the transfer object.

Item 16. Use, for decoration of a transfer object by hydraulic transfer, of a film which comprises a laminated body including on a water-soluble film an extension control resin layer, and a luster ink layer containing a luster pigment and a binder resin, wherein the hydraulic transfer film has an irregularity shape on a surface of the laminated body on a side opposite to the water-soluble film, and a resin that forms the extension control resin layer contains a resin A having it glass transition temperature of 80° C. or higher.

Advantages of the Invention

A hydraulic transfer film according to the present invention has an irregularity shape properly formed during production, and is capable of imparting design property with excellent brightness and luxuriousness to a resin molded article, and therefore by using the hydraulic transfer film according to the present invention, a decorative molded article having design property with excellent brightness and luxuriousness can be provided.

EMBODIMENTS OF THE INVENTION

[Hydraulic Transfer Film]

Figure 1:
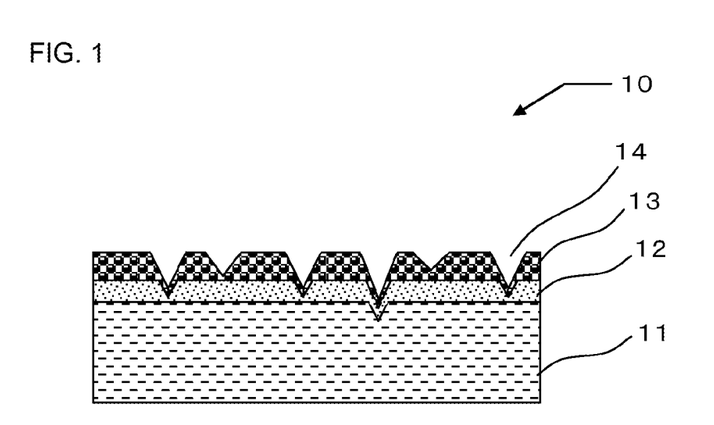
FIG. 1 is a schematic sectional view showing one example of a configuration of a hydraulic transfer film according to the present invention.
Figure 3:
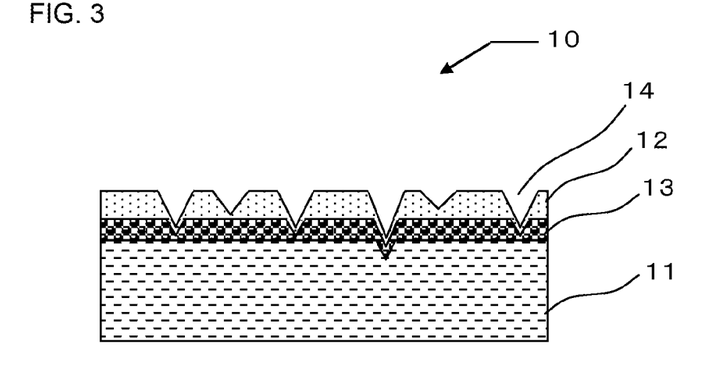
FIG. 3 is a schematic sectional view showing one example of the configuration of the hydraulic transfer film according to the present invention.
Figure 4:
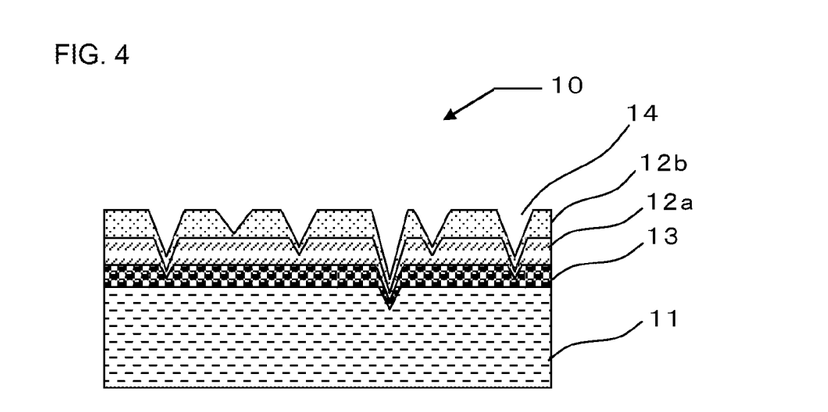
FIG. 4 is a schematic sectional view showing one example of the configuration of the hydraulic transfer film according to the present invention.

Hereinafter, the present invention will be described with reference to the drawings. FIGS. 1, 3 and 4 are schematic sectional views each showing one example of a hydraulic transfer film according to the present invention.

A hydraulic transfer film 10 according to the present invention includes a laminated body including on a water-soluble film 11 an extension control resin layer 12, and a luster ink layer 13 containing a luster pigment and a binder resin, wherein the hydraulic transfer film has an irregularity shape on a surface of the laminated body on a side opposite to the water-soluble film, and a resin that forms the extension control resin layer contains a resin A having a glass transition temperature of 80° C. or higher.

As shown in, for example, FIG. 1, the hydraulic transfer film 10 according to the present invention may be a laminated body including the extension control resin layer 12 and the luster ink layer 13 in this order on the water-soluble film 11. Hereinafter, the laminated body with the water-soluble film 11, the extension control resin layer 12 and the luster ink layer 13 laminated in this order in the hydraulic, transfer film 10 according to the present invention may be referred to as a "laminated body A".

As shown in, for example, FIG. 3 or FIG. 4, the hydraulic transfer film 10 according to the present invention may be a laminated body including the luster ink layer 13 and the extension control resin layer 12 in this order on the water-soluble film 11. In this case, the extension control resin layer 12 preferably has a multilayer structure of two or more layers, and the hydraulic transfer film 10 shown in FIG. 4 includes two extension control resin layers: extension control resin layers 12a and 12b. Hereinafter, the laminated body with the water-soluble film 11, the luster ink layer 13 and the extension control resin layer 12 laminated in this order in the hydraulic transfer film 10 according to the present invention may be referred to as a "laminated body B"

(Water-Soluble Film)

The water-soluble film serves as a substrate in the hydraulic transfer film according to the present invention, and is removed at the time when a decorative molded article is obtained after hydraulic transfer. The water-soluble film may be any film as long as it is soluble in water or swellable in water, and may be appropriately selected from water-soluble films that have been generally used heretofore as hydraulic transfer films, and used.

Examples of the resin that forms the water-soluble film include various kinds of water-soluble polymers such as polyvinyl alcohol resins, dextrin, gelatin, glue, casein, shellac, guru arabic, starch, protein, polyacrylic acid amide, sodium polyacrylate, polyvinyl methyl ether, copolymers of methyl vinyl ether and maleic anhydride, copolymers of vinyl acetate and itaconic acid, polyvinyl pyrrolidone, acetyl cellulose, acetyl butyl cellulose, carboxymethyl cellulose, methyl cellulose, hydroxyethyl cellulose and sodium alginate. These resins may be used alone, or may be used in combination of two or more thereof. The water-soluble film may contain a rubber component such as mannan, xanthan gum or guar gum.

Among the above-mentioned water-soluble films, a polyvinyl alcohol (PVA) resin film is preferred from the viewpoint of production stability, solubility in water and economy at particular. The polyvinyl alcohol resin film may contain additives such as starch and rubber in addition to PVA.

For the polyvinyl alcohol resin film, the mechanical strength required in formation of a printing layer for transfer, humidity resistance during handling, the rate of softening due to water absorption after floating the film on the water surface, the time taken for spreading or diffusion in water, ease of deformation in the transfer step, and so on can be appropriately adjusted for the water-soluble film by changing the polymerization degree and saponification degree of polyvinyl alcohol, and the blending amount of additives such as starch and rubber.

Suitable water-soluble films composed of a polyvinyl alcohol resin film include those described in Japanese Patent Laid-open Publication No. S54-92406, and for example, a water-soluble film having, a mixed composition with 80% by mass of a PVA resin, 15% by mass of a polymer water-soluble resin and 5% by mass of starch, and having an equilibrium water content of about 3%.

It is preferred that the polyvinyl alcohol resin film is soluble in water, but exists as a film while being swollen in water and softened in a stage before it is dissolved in water. This is because excessive fluidization and deformation of the printing layer for transfer during hydraulic transfer can be prevented by performing hydraulic transfer when the polyvinyl alcohol resin film exists as a film.

The thickness of the water-soluble film is preferably 10 to 100 μm. When the thickness is 10 μm or more, the film has proper uniformity and high production stability. On the other hand, when the thickness is 100 μm or less, the film has moderate solubility in water and is excellent in printability. From the above standpoints, the thickness of the water-soluble film is more preferably in the range of 20 to 60 μm.

The above-mentioned water-soluble film can be laminated with a substrate having water permeability, such as a paper sheet, a nonwoven fabric or a cloth, and used, but when such a substrate having water permeability and a water-soluble film soluble in water or swellable in water are laminated with each other, it is preferred that the substrate having water permeability is separated from the water-soluble film soluble in water or swellable in water before the hydraulic transfer film is floated on the water surface, or the substrate having water permeability is caused to separate from the water-soluble film soluble in water or swellable in water by action of water after the hydraulic transfer film is floated on the water surface.

(Extension Control Resin Layer)

The extension control resin layer is a layer that is provided on the water-soluble film, and required to contain the resin A having as glass transition temperature of 80° C. or higher as a resin that forms the extension control resin layer. When the extension control resin layer is provided, shapability which ensures that an irregularity shape can be properly formed during production of a hydraulic transfer film is obtained, and excessive extension of the luster ink layer during hydraulic transfer is suppressed, and an irregularity impression generation section corresponding to an irregularity shape is formed to retain the irregularity impression, so that design property with brightness and luxuriousness (hereinafter, may be referred to simply as design property) can be obtained. The irregularity impression generation section corresponding to an irregularity shape will be described in detail in explanation of a method for producing a decorative molded article.

When the hydraulic transfer film according to the present invention has a laminated structure of the laminated body A with a water-soluble film, in extension control resin layer and a luster ink layer laminated in this order, the extension control resin layer is a layer located on the surface layer side of the luster ink her after the film is transferred to a resin molded article, so that the luster ink layer is viewed through the extension control resin layer, and therefore the extension control resin layer is preferably transparent so that the luster ink layer can be more clearly viewed. Here, being transparent is a concept that includes not only being colorless and transparent, but also being colored and transparent and being semi-transparent. The extension control resin layer may have a single-layer structure, or may have a multilayer structure of two or more layers.

On the other hand, when the hydraulic transfer film according to the present invention has a laminated structure of the laminated body B with a water-soluble film, a luster ink layer and an extension control resin layer laminated in this order, the extension control resin layer is a layer located on the back surface layer side of the luster ink layer after the film is transferred to a resin molded article, so that the luster ink layer is not viewed through the extension control resin layer. Accordingly, whether the extension control resin layer is transparent, semi-transparent or opaque, or colored or colorless, it can be selected according to a desired design. Also in the laminated body B, the extension control resin layer may have a single-layer structure, or may have a multilayer structure of two or more layers.

The resin that forms the extension control resin layer is required to contain the resin A having a glass transition temperature of 80° C. or higher. When the resin that forms the extension control resin layer does not contain the resin A having a glass transition temperature of 80° C. or higher, excellent shapability cannot be obtained, and thus excellent design property cannot be obtained. The upper limit of the glass transition temperature is not particularly limited, but it is preferably 145° C. or lower, further preferably 130° C. or lower for improving transfer processability (followability).

In the present invention, the glass transition temperature is measured in the following manner.

A sample heated to 200° C. and cooled from this temperature to 0° C. at a temperature falling rate of 10° C./minute was measured at a temperature rising rate of 10° C./minute using a differential scanning calorimeter. When a peak is observed at a temperature lower than the softening point by 20° C. or more, the temperature at the peak is read as a glass transition temperature. When a peak is not observed at a temperature lower than the softening point by 20° C. or more, and a step difference is observed, the temperature at an intersection of a tangent line showing the maximum slope of the curve of the step difference part and an extended line of the base line of the step difference on the high temperature side is read as a glass transition temperature.

The resin A is not particularly limited as long as it has a glass transition temperature of 80° C. or higher, and preferred examples thereof include acrylic resins, acrylic polyol resins, nitrocellulose resins and vinyl chloride-vinyl acetate copolymer resins. Among them, acrylic polyol resins are preferred. In the present invention, these resins may be used alone or in combination of two or more thereof.

Preferably, a water-insoluble resin is used as the resin A for suppressing excessive extension of the luster ink layer during hydraulic transfer, and properly forming an irregularity impression generation section corresponding to an irregularity shape. Here, the water-insoluble resin refers to a resin that is generally known as resin insoluble in water, and specific examples thereof include those show above as preferred examples as the resin A.

As long as the resin that forms the extension control resin layer contains the resin A, it may contain another resin, for example the resin B having a glass transition temperature of lower than 80° C. For example, the resin B to be used in combination with the resin A is preferably a resin having a glass transition temperature of 60° C. or lower, more preferably a resin having a glass transition temperature of 20° C. or lower, further preferably a resin having a glass transition temperature of 10° C. or lower.

Preferred examples of the resin B include polyolefin resins such as polyethylene and polypropylene, urethane resins, acetal resins and alkyd resins, and urethane resins and alkyd resins are preferred. When the resin B having a low glass transition temperature is combined with the resin A, excellent transfer processability (followability) can be obtained. Particularly, when an acrylic polyol resin is used as the resin A, it is preferred to combine the resin A with a urethane resin, and when a nitrocellulose resin is used as the resin A, it is preferred to combine the resin A with an alkyd resin.

The content of the resin A in the resin that forms the extension control resin layer is preferably 50% by mass or more, more preferably 50 to 95% by mass, further preferably 60 to 90% by mass, especially preferably 70 to 85% by mass. When the content of the resin A in the resin falls within the above-mentioned range, excellent shapability and design property can be obtained, and also excellent transfer processability (followability) can be obtained.

The thickness of the extension control resin layer is preferably 0.5 to 10 μm, more preferably 0.5 to 5 μm, further preferably 0.5 to 2.5 μm. The thickness of the extension control resin layer is a thickness of one extension control resin layer when the extension control resin layer has a multilayer structure as described later. When the thickness of the extension control resin layer falls within the above-mentioned range, excellent shapability and design property can be obtained, and also excellent transfer processability (followability) can be obtained. Further, the time for applying an activator during hydraulic transfer can be secured, and the film can be more suitably transferred to a transfer object.

When the hydraulic transfer film according to the present invention has the laminated structure of the laminated body B, the irregularity shape of the hydraulic transfer film is required to exist on at least a surface of the extension control resin layer on a side opposite to the luster ink layer. When the hydraulic transfer film according to the present invention has an irregularity shape, and an irregularity impression generation section corresponding to the irregularity shape is formed during hydraulic transfer to retain an irregularity impression, luxuriousness can be exhibited in addition to brightness. As shown in FIG. 3, recesses of the irregularity shape may abide in the extension control resin layer, or may extend to the luster ink layer, or even to the water-soluble film. As shown in FIG. 4, recesses may abide in the extension control resin layer 12b, or may extend to the extension control resin layer 12a, or to the luster ink layer, or even to the water-soluble film when the extension control resin layer has a multilayer structure of two or more layers. In the present invention, it is preferred that the irregularity shape extends to the luster ink layer and the water-soluble film for obtaining a depth of the irregularity shape as described later to obtain excellent shapability and design property.

In the hydraulic transfer film baying the laminated structure of the laminated body B (hereinafter, may be referred to simply as a "laminated body B"), the depth of the irregularity shape is preferably 5 to 80%, more preferably 10 to 70%, further preferably 20 to 60% with respect to the total thickness of the hydraulic transfer film for obtaining excellent shapability and design property. Here, in the present invention, the depth of the irregularity shape of the laminated body B refers to a depth of the recess of the irregularity shape. Here, when a surface of the extension control resin layer on a side opposite to a surface provided with the luster ink layer is assumed to be a substantially straight line, the maximum value of depths from the straight line is defined as the depth of the recess.

In the laminated body B, the cycle width (pitch) of the irregularity shape is preferably 10 to 100 μm, more preferably 20 to 40 μm. When the cycle width (pitch) of the irregularity shape falls within the above-mentioned range, excellent shapability and design property can be obtained. Here, in the present invention, the cycle width (pitch) of the irregularity shape of the laminated body B refers to a separation distance between adjacent projections.

The width of the irregularity shape of the laminated body B is preferably 10 to 100 μm, more preferably 20 to 40 μm. When the width of the irregularity shape falls within the above-mentioned range, excellent shapability and design property can be obtained. Here, in the present invention, the width of the irregularity shape of the laminated body B refers to a width of the projection itself.

In the laminated body B, the irregularity shape can be suitably provided by embossing.

In the laminated body B, the irregularity shape may be formed in conformity with a brightness design expression, and may be appropriately selected according to a combination of the pattern of the luster ink layer, and preferred examples thereof include numerous-line channels, woodgrain vessel channels, woodgrain annual ring patterns, grain patterns, rift patterns, metal crystal plane patterns, texture patterns, satin patterns, leather drawing patterns, mat surface patterns, hairline patterns, spin-like patterns, characters, symbols and geometric figures. The irregularity shape may be patterned so as to exhibit a hologram effect in combination with the luster ink layer.

In the laminated body B, it is preferred that the extension control resin layer has a multilayer structure of two or more layers. When the extension control resin layer has a multilayer structure, shapability and design property can be further improved. When in addition to shapability and design property, transfer processability (followability) is considered, the extension control resin layer has preferably two to four layers, more preferably two to three layers, especially preferably two layers. Further, the time for applying an activator during hydraulic transfer can be secured, the degree of permeation of an activator into the extension control resin layer and the luster ink layer can be easily adjusted, and the film can be more suitably transferred to a transfer object.

When the extension control resin layer has a multi layer structure in the laminated body B, it is preferred that the resin that forms the extension control resin layer located at the outermost surface contains an alkyd resin and a nitrocellulose resin as the resin A. This is because excellent shapability and design property, and transfer processability (followability) can be obtained. Further, when the resin that forms the extension control resin layer at the outermost surface contains an alkyd resin and a nitrocellulose resin as the resin A, it is preferred that the resin that forms extension control resin layer other than the extension control resin layer located at the outermost surface contains an acrylic polyol resin as the resin A. Owing to a synergistic effect resulting from combination of the extension control resin layer at the outermost surface and extension control resin layers other than the extension control resin layer at the outermost surface, extremely excellent shapability and design property, and transfer processability (followability) can be obtained.

(Luster Ink Layer)

The bright ink later is a layer that exhibits brightness. When the hydraulic transfer film 10 according to the present invention has the laminated structure of the laminated body. A described above, the luster ink layer is a layer that exhibits brightness, and exhibits luxuriousness when an irregularity shape is provided on at least a surface of the luster ink layer on a side opposite to the extension control resin layer.

In the present invention, the irregularity shape of the hydraulic transfer film having the laminated structure of the laminated body A (hereinafter, may be referred to simply as a "laminated body A") is required to exist on at least a surface of the luster ink layer on a side opposite to the extension control resin layer. When the hydraulic transfer film according to the present invention has an irregularity shape, and an irregularity impression generation section corresponding to the irregularity shape is formed during hydraulic transfer to retain an irregularity impression, luxuriousness can be exhibited in addition to brightness. As shown in FIG. 1, recesses of the irregularity shape of the laminated body A may abide in the luster ink layer, or may extend to the extension control resin layer, or even to the water-soluble film. In the present invention, it is preferred that the irregularity shape extends to the extension control resin layer and the water-soluble film for obtaining a depth of the irregularity shape as described later to obtain excellent shapability and design property.

The depth of the irregularity shape of the laminated body A is preferably 5 to 80%, more preferably 10 to 70%, further preferably 20 to 60% with respect to the total thickness of the hydraulic transfer film for obtaining excellent shapability and design property. Here, in the present invention, the depth of the irregularity shape of the laminated body A refers to a depth of the recess of the irregularity shape. Here, when a surface of the luster ink layer on a side opposite to a surface provided with the extension control resin layer is assumed to be a substantially straight line, the maximum value of depths from the straight line is defined as the depth of the recess of the laminated body A.

In the laminated body A, the cycle width (pitch) of the irregularity shape is preferably 10 to 100 μm, more preferably 20 to 40 μm. When the cycle width (pitch) of the irregularity shape of the laminated body A falls within the above-mentioned range, excellent shapability and design property can be obtained. Here, in the present invention, the cycle width (pitch) of the irregularity shape of the laminated body A refers to a separation distance between adjacent projections.

The width of the irregularity shape of the laminated body A is preferably 10 to 100 μm, more preferably 20 to 40 μm. When the width of the irregularity shape of the laminated body A falls within the above-mentioned range, excellent shapability and design property can be obtained. Here, in the present invention, the width of the irregularity shape refers to a width of the projection itself.

The irregularity shape of the laminated body A can be suitably provided by embossing.

The irregularity shape of the laminated body A may be formed in conformity with a brightness design expression, and may be appropriately selected according to a combination of a pattern of the luster ink layer as described later, and preferred examples thereof include numerous-line channels, wood rain vessel channels, woodgrain annual ring patterns, grain patterns, rift patterns, metal crystal plane patterns, texture patterns, satin patterns, leather drawing patterns, mat surface patterns, hairline patterns, spin-like patterns, characters, symbols and geometric figures. The irregularity shape may be patterned so as to exhibit a hologram effect in combination with the luster ink layer.

Preferably, the luster ink layer is formed from a bright ink containing a binder resin and a luster pigment.

Examples of the binder resin include thermoplastic resins, and preferred specific examples thereof include acrylic resins, polyester resins such as alkyd resins, unsaturated polyester resins, urethane resins (e.g., polyester urethane resins), polycarbonate resins, vinyl chloride-vinyl acetate copolymer resins, polyvinyl acetal resins (butyral resins) such as polyvinyl butyral, and nitrocellulose resins. These resins may be used alone, or in combination of two or more thereof. In the present invention, alkyd resins and nitrocellulose resins are preferred, and it is more preferred to use these resins in combination. When these binder resins are used, excellent shapability can be obtained.

The luster pigment is not particularly limited as long as it is a pigment that can exhibit brightness with interference of light, and preferred examples thereof include metallic pigments, pearl pigments and luminous pigments.

The metallic pigment is composed of a metal such as gold, silver, platinum, palladium, nickel, copper, aluminum, chromium, brass or tin, an alloy thereof, or a metal oxide thereof, and a metallic pigment composed of a scale-like foil piece of aluminum, brass or the like is preferable because it has high brightness and is inexpensive. Preferred examples of the pearl pigment include scale-shaped alumina pigments coated with titanium oxide or iron oxide, and mica pigments coated with titanium oxide or iron oxide.

The average particle size of the luster pigment is preferably 1 to 20 μm, more preferably 3 to 15 μm. When the average particle size of the luster pigment falls within the above-mentioned range, excellent brightness can be obtained, and luxuriousness can be easily obtained in combination with an irregularity shape.

The pattern of the luster ink layer may be appropriately selected according to a combination with the irregularity shape, and examples thereof include woodgrain patterns, rift patterns resembling a surface of rock, such as marble patterns (e.g., travertine marble patterns), textile patterns resembling texture or fabric patterns, tiling patterns and brick masonry patterns, and also patterns formed by combining, these patterns, such as those of wooden mosaics and patchworks. So called solid printing may also be employed in which the entire surface is uniformly colored.

The thickness of the luster ink layer is preferably 0.5 to 5 µm, more preferably 0.5 to 3 µm, further preferably 0.5 to 2 µm. When the thickness of the luster ink layer falls within the above-mentioned range, excellent shapability and design property can be obtained, and also excellent transfer processability (followability) can be obtained.

(Second Extension Control Resin Layer)

When the hydraulic transfer film according to the present invention has the laminated structure of the laminated body A, a second extension control resin layer 15 may be further provided on the luster ink layer 13 on a side opposite to the extension control resin layer 12 in addition to the extension control resin layer 12 provided between the water-soluble film 11 and the luster ink layer 13. The second extension control resin layer 15 is formed as a layer containing the resin A having a glass transition temperature of 80° C. or higher similarly to the extension control resin layer 12. When the second extension resin layer 15 is provided, the decorative molded article can be made to exhibit a further excellent irregularity impression. When the laminated body A includes the second extension control resin layer 15, an irregularity shape 14 is formed so as to extend at least from the second extension control resin layer 15 to a surface of the luster ink layer 13 on a side opposite to the extension control resin layer 12.

The second extension control resin layer 15 may have a configuration similar to that of the above-mentioned extension control resin layer 12. The resin A contained in the extension control resin layer 12 and the resin A contained in the second extension control resin layer 15 may be the same, or may be mutually different. The second extension control resin layer 15 is especially preferably a layer containing an alkyd resin and a nitrocellulose resin as the resin A. Such a configuration allows further excellent shapability to be exhibited.

[Method for Producing Hydraulic Transfer Film]

The method for producing a hydraulic transfer film according to the present invention includes, in order, step (1): a step of laminating on a water-soluble film an extension control resin layer formed of a resin composition containing a resin A having a glass transition temperature of 80° C. or higher, and a luster ink layer containing as luster pigment and a binder resin; and step (2): a step of performing embossing from a surface of the laminated body on a side opposite to the water-soluble film. Hereinafter, the method for producing a hydraulic transfer film according to the present invention will be described in detail for each of the case of the laminated body A and the case of the laminated body B.

<Laminated Body A>

When the hydraulic transfer film according to the present invention has the laminated structure of the laminated body A, the method for production thereof includes, in order, step (A): a step of laminating on a water-soluble film an extension control resin layer formed of a resin including a resin A having a glass transition temperature of 80° C. or higher; step (B): a step of laminating a luster ink layer on the extension control resin layer; and step (C): a step of performing embossing from a surface of the luster ink layer on a side opposite to the extension control resin layer to provide an irregularity shape on at least the surface of the luster ink layer.

In step (A), the extension control resin layer is laminated on the water-soluble film by a known coating method or printing method, coextrusion with a water-soluble film, or lamination of a resin film to a water-soluble film. Among them, a known coating method or printing method is preferred.

Examples of the known coating method include gravure coating and reverse coating, and examples of the known printing method include gravure printing.

It is preferred that in step (B), the luster ink layer is formed by a known coating method or printing method as mentioned above as a method for forming the extension control resin layer using a bright ink containing a hinder resin and a luster pigment.

Embossing to be performed in step (C) of forming an irregularity shape is carried out by an embossing apparatus normally at a temperature of 80 to 130° C. under a pressure of 20 to 100 ton/m$^2$, preferably 20 to 60 ton/m$^2$ for a pressing time of about 1 to 10 minutes, or carried out by continuous embossing using an embossing roll etc, so that a desired irregularity shape is formed.

The embossing plate to be used here is not particularly limited as long as it has a dimension which ensures that the depth, cycle width (pitch) and width of the irregularity shape described above can be achieved. The depth of the irregularity shape of the embossing plate is normally about 10 to 80 µm, preferably 20 to 60 µm, more preferably 30 to 45 µm.

<Laminated Body B>

When the hydraulic transfer film according to the present invention has the laminated structure of the laminated body B, the method for production thereof includes, in order, step (A): a step of laminating a luster ink layer on a water-soluble film; step (B): a step of laminating on the luster ink layer an extension control resin layer formed of a resin including a resin A having a glass transition temperature of 80° C. or higher; and step (C): a step of performing embossing from a surface of the extension control resin layer on a side opposite to the luster ink layer to provide an irregularity shape on at least the surface of the extension control resin layer.

It is preferred that in step (A), the luster ink layer is formed by a known coating method or printing method using a luster ink containing a binder resin and a luster pigment.

Examples of the known coating method include gravure coating and reverse coating, and examples of the known printing method include gravure printing.

In step (B), the extension control resin layer is laminated on the luster ink layer not only by a known coating method or printing method as shown above as an example in the method for forming the luster ink layer, but also by extrusion with a water-soluble film provided with a luster ink layer, or lamination of a resin film on a luster ink layer side of a water-soluble film provided with the luster ink layer. Among them, a known coating method or printing method is preferred.

Embossing to be performed in step (C) of forming an irregularity shape is carried out by an embossing apparatus normally at a temperature of 80 to 130° C. under a pressure of 20 to 100 ton/m$^2$, preferably 20 to 60 ton/m$^2$ for a pressing time of about 1 to 10 minutes, or carried out by continuous embossing using an embossing roll etc, so that a desired irregularity shape is formed.

The embossing plate to be used here is not particularly limited as long as it has a dimension which ensures that the depth, cycle width (pitch) and width of the irregularity shape described above can be achieved. The depth of the irregularity shape of the embossing plate is normally about 10 to 70 μm, preferably 20 to 60 μm, more preferably 30 to 45 μm.

[Method for Producing Decorative Molded Article]

The method for producing, a decorative molded article according to the present invention includes, in order, step (a): an activator applying step of applying, before or after floating the hydraulic transfer film on a water surface with the water-soluble film facing the water surface, an activator composition to a surface of the hydraulic transfer film on a side opposite to the water-soluble film; step (b): a step of pressing a transfer object against the activator composition-applied surface of the hydraulic transfer film subjected to the step (a) and floated on the water surface, and adhering the hydraulic transfer film to a transfer surface of the transfer object by means of a hydraulic pressure; and step (c): a film removing step of removing the water-soluble film adhered to the transfer surface of the transfer object.

When one having the laminated structure of the laminated body A is used as a hydraulic transfer film, the method for producing a decorative molded article according to the present invention includes, in order, step (a); an activator applying step of applying an activator composition to a luster ink layer of a hydraulic transfer film before or after floating the hydraulic transfer film on a water surface with a water-soluble film facing the water surface, the hydraulic transfer film including the water-soluble film, an extension control resin layer and the luster ink layer in this order, and having an irregularity shape on at least a surface of the luster ink layer on a side opposite to the extension control resin layer, the extension control resin layer containing a resin A having at glass transition temperature of 80° C. or higher; step (b): a step of pressing a transfer object onto the hydraulic transfer film subjected to the step (a) and floated on the water surface, and adhering the luster ink layer to a transfer surface of the transfer object by means of a hydraulic pressure; and step (c): a film removing step of removing the water-soluble film adhered to the transfer surface of the transfer object, and the extension control resin layer.

Figure 2:
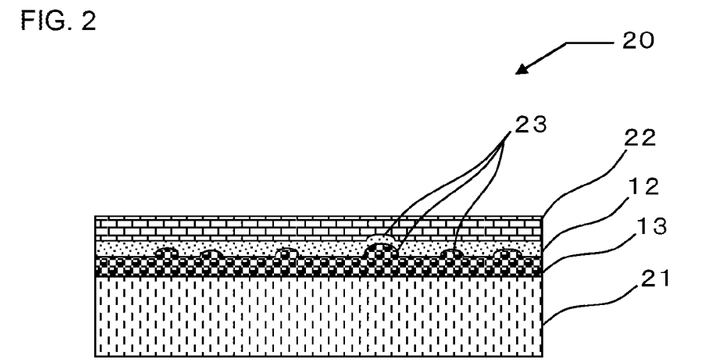
FIG. 2 is a schematic sectional view showing one example of a decorative molded article obtained by a method for producing a decorative molded article according to the present invention.

FIG. 2 is a schematic sectional view showing one example of a configuration of a decorative molded article obtained by the method for producing a decorative molded article according to the present invention when one having the laminated structure of the laminated body A is used as a hydraulic transfer film, the decorative molded article being obtained using the hydraulic transfer film shown in FIG. 1. A decorative molded article 20 obtained by the method for producing a decorative molded article according to the present invention includes a transfer object 21, a luster ink layer 13 and an extension control resin layer 12 in order. The decorative molded article includes an irregularity impression generation section 23 corresponding to an irregularity shape 14 of the luster ink layer 13, so that an irregularity impression is retained, and thus the decorative molded body has design property with brightness and luxuriousness. The decorative molded body may be provided with a top coat layer 22 as necessary.

On the other hand, when one having the laminated structure of the laminated body B is used as a hydraulic transfer film, the method for producing a decorative molded article according to the present invention includes, in order, step (a): an activator applying step of applying an activator composition to an extension control resin layer of a hydraulic transfer film before or after floating the hydraulic transfer film on a water surface with a water-soluble film facing the water surface, the hydraulic transfer film including the water-soluble film, a brightness ink layer and the extension control resin layer in this order, and having an irregularity shape on at least a surface of the extension control resin layer on a side opposite to the luster ink layer, wherein a resin that forms the extension control resin layer includes a resin A having a glass transition temperature of 80° C. or higher; step (b): a step of pressing a transfer object onto the hydraulic transfer film subjected to the step (a) and floated on the water surface, and adhering the extension control resin layer to a transfer surface of the transfer object by means of a hydraulic pressure; and step (c): to film removing step of removing the water-soluble film adhered to the transfer surface of the transfer object.

Figure 5:
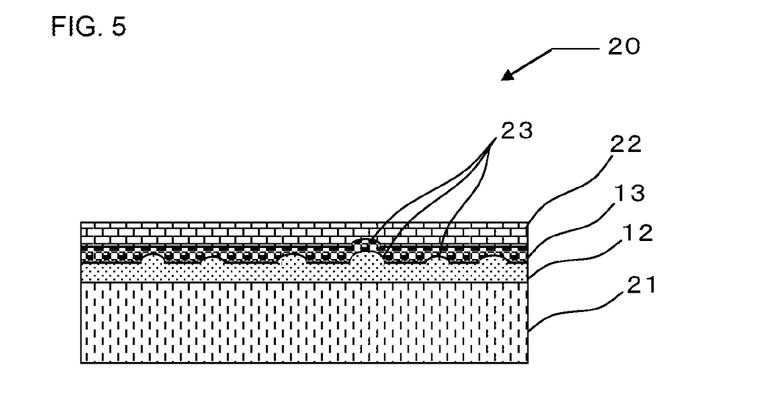
FIG. 5 is a schematic sectional view showing one example of the decorative molded article obtained by the method for producing a decorative molded article according to the present invention.

FIG. 5 is a schematic sectional view showing one example of a configuration of a decorative molded article obtained by the method for producing a decorative molded article according to the present invention when one having the laminated structure of the laminated body B is used as a hydraulic transfer film, the decorative molded article being obtained using the hydraulic transfer film shown in FIG. 3. The decorative molded article 20 shown in FIG. 5 and obtained by the method for producing a decorative molded article according to the present invention includes the transfer object 21, the extension control resin layer 13 and the luster ink layer 12, and includes the irregularity impression generation section 23 corresponding to the irregularity shape 14 of the extension control resin layer 13, so that an irregularity impression is retained, and thus the decorative molded body has design property with brightness and luxuriousness. The decorative molded body may be provided with the top coat layer 22 as necessary.

Irrespective of whether the hydraulic transfer film to be used has the laminated structure of the laminated body A or B, the irregularity impression generation section corresponding to the irregularity shape is formed with the irregularity shape made generally gentle as the hydraulic transfer film according to the present invention is slightly extended during hydraulic transfer, so that a visual irregularity impression is retained. The hydraulic transfer film according to the present invention is moderately extended during hydraulic transfer to form an irregularity impression generation section, so that an irregularity impression is retained, and thus excellent design property are obtained along with excellent transfer processability (followability).

(Activator Applying Step (a))

The activator applying step (a) is a step of applying, before or after floating the hydraulic transfer film on a water surface with the water-soluble film facing the water surface, an activator composition to a surface of the hydraulic transfer film on a side opposite to the water-soluble film.

When one having the laminated structure of the laminated body A is used as a hydraulic transfer film, the activator applying step (a) is a step of applying an activator composition to the luster ink layer before or after floating the hydraulic transfer film on the water surface. By applying an activator to the luster ink layer in this step, the surface of the luster ink layer is roughened, so that the film is easily adhered to a transfer object.

On the other hand, when one having the laminated structure of the laminated body B is used as a hydraulic transfer film, the activator applying step (a) is a step of applying an activator composition to the extension control resin layer before or after floating the hydraulic transfer film on the water surface. By applying an activator to the extension control resin layer in this step, the surface of the extension control resin layer is roughened, so that the film is easily adhered to a transfer object.

The hydraulic transfer film is floated on the water surface with the water-soluble film facing the water surface. For floating the hydraulic transfer film on the water surface, leaf-like printed sheets may be floated one by one, or a continuous belt-shaped, hydraulic transfer film may be continuously fed and floated on the surface of water which is made to flow in one direction.

The activator composition is not particularly limited as long as it has a function which ensures that the luster ink layer to be transferred in the hydraulic transfer film can be roughened, and the surface of a transfer object as described later is dissolved, and the activator composition preferably has such a property that it is not evaporated until the luster ink layer is transferred to the transfer surface of the transfer object. Preferred examples of the activator composition include compositions containing esters, acetylene glycols, ethers and a resin.

Preferred examples of the esters include ethyl acetate, propyl acetate, butyl acetate, isobutyl acetate, sec-butyl acetate, ten-butyl acetate, dibutyl oxalate, dibutyl phthalate, dimethyl phthalate, dioctyl phthalate and diisooctyl phthalate.

Preferred examples of the acetylene glycols include methoxybutyl acetate, ethoxybutyl acetate, ethyl carbitol acetate, propyl carbitol acetate and butyl carbitol acetate.

Preferred examples of the ethers include methyl cellosolve, butyl cellosolve and isoamyl cellosolve.

Preferred examples of the resin include thermoplastic resins such as homopolymers or copolymers of acrylate-based monomers, and thermosetting resins such as polyaraide resins, polyester resins, phenol resins, melamine resins, urea resins, epoxy resins, alkyd phthalate resins, diallyl phthalate resins, alkyd resins and polyurethane resins, and among them, thermosetting resins are preferred.

The preferred content of each component of the activator composition to be used in the present invention is 5 to 40% by mass for the esters, 40 to 80% by mass for the acetylene glycols, 5 to 30% by mass for the ethers, and 1 to 20% by mass for the resin.

The activator composition may be applied by a spray coating method etc., and the application amount thereof is normally 1 to 50 $g/m^2$, preferably 3 to 30 $g/m^2$, further preferably 10 to 20 $g/m^2$ (Step (b))

The step (b) is a step of pressing a transfer object against the activator composition-applied surface of the hydraulic transfer film subjected to the step (a) and floated on the water surface, and adhering the hydraulic transfer film to a transfer surface of the transfer object by means of a hydraulic pressure.

When one having the laminated structure of the laminated body A is used as a hydraulic transfer film, the step (b) is a step of pressing a transfer object onto the hydraulic transfer film subjected to the step (a) and floated on the water surface, and adhering the luster ink layer to a transfer surface of the transfer object by means of a hydraulic pressure.

On the other hand, when one having the laminated structure of the laminated body B is used as a hydraulic transfer film, the step (b) is a step of pressing a transfer object onto the hydraulic transfer film subjected to the step (a) and floated on the water surface, and adhering the extension control layer to a transfer surface of the transfer object by means of a hydraulic pressure.

The temperature of water for floating the hydraulic transfer film and applying a water pressure thereto should be appropriately adjusted according to a type of the water-soluble film, and is preferably about 25 to 50° C., more preferably 25 to 35° C.

The transfer time of the hydraulic transfer film according to the present invention and the transfer object is preferably about 20 to 120 seconds, more preferably about 30 to 60 seconds. Here, the transfer time refers to a time until transfer to the transfer object is completed after the transfer film according to the present invention is floated on water.

(Transfer Object)

As the transfer object, for example, a structure composed of a material such as a resin such as a polystyrene resin, an acrylonitrile-butadiene-styrene copolymer resin (ABS resin), a polycarbonate resin, a melamine resin, a phenol resin, a urea resin, a fiber-based resin, polyethylene or polypropylene, or a mixture of these resins, a metal such as iron, aluminum or copper, a ceramic such as porcelain, glass or enamel, or wood can be used.

The shape of the transfer surface may be a two-dimensional shape, i.e. a plane shape, or may be three-dimensional shape such as an irregularity shape or a curved surface shape. Among the above-mentioned transfer objects, normally structures made of resin are often used. To the structure made of resin, a mold release agent sticks during molding, and dust and greasy matters may stick, and thus it is preferred to clean the transfer surface with a degreasing liquid beforehand for transferring the luster ink layer, extension control resin layer or second extension control resin layer of the hydraulic, transfer film with high adhesion.

In the step (b), the activator composition applied onto the luster ink layer comes into contact with the transfer object to dissolve the surface of the transfer object, so that adhesion between the transfer film and the transfer object is improved.

(Film Removing Step (c))

The film removing step (c) is a step of removing the water-soluble film adhered to the transfer surface of the transfer object.

The water-soluble film can be removed by, for example, performing shower washing using water. The water-soluble film deposited on the transfer surface is removed through the step (c). Conditions for shower washing vary depending on a material that forms the water-soluble film and so on, but normally a water temperature of about 15 to 60° C. and a washing time of about 10 seconds to 5 minutes are preferred. After the step (c), the transfer object is sufficiently dried to evaporate water, so that a resin molded article given a desired design by the luster ink layer and extension control resin layer transferred to the transfer surface of the transfer body is obtained.

(Step (d))

The method for producing a decorative molded article according to the present invention may further include step (d) of forming a top coat layer on the transferred extension control resin layer as desired after the step (c).

In the step (d), to the extension control resin layer transferred to the transfer surface of the transfer object in the step (c), a top coat agent is applied as necessary to form a top coat layer for improvement of the surface strength, protection of the surface and adjustment of surface glossiness. Preferred examples of the top coat agent include resin compositions containing a thermoplastic resin, a thermosetting resin or an ultraviolet ray-curable resin, specifically a urethane resin, an epoxy resin, an acrylic resin, a fluororesin, a silicone resin or the like.

The top coat layer can be formed by applying and curing the above-mentioned resin composition. As an application method, a known method such as spray coating, electrostatic coating, blush coating or dip coating can be used. A curing method may be appropriately selected according to a resin composition to be used. The resin composition may be aged for several days when a thermoplastic resin is used, the resin composition may be heat-treated when a thermosetting resin is used, and the resin composition may be irradiated with an appropriate ultraviolet ray when an ultraviolet ray-curable resin is used.

EXAMPLES

The present invention will now be described more in detail by way of examples, but the present invention is in no way limited to these examples.

(1) Evaluation of Shapability

A luster ink layer of a hydraulic transfer film in each example was embossed (embossing conditions: temperature of 120° C.; pressure of 40 ton/m$^2$; and pressing time of 5 minutes), a state of the surface of the luster ink layer was visually observed after an embossing plate was separated, and shapability was evaluated based on the following criteria.

◯: the luster ink layer was not peeled, and an irregularity shape was extremely satisfactorily formed.

Δ: the luster ink layer was slightly peeled in hot conditions, but when the embossing plate was separated after the hydraulic transfer film was cooled to room temperature, the luster ink layer was not peeled, and an irregularity shape was formed to the degree that there would be no problem in practical use.

x: when the embossing plate was separated after the hydraulic, transfer film was cooled to room temperature, the luster ink layer was peeled, and an irregularity shape could not be formed.

(2) Evaluation of Design Property

An activator composition having composition as described below was applied in an amount of 3 g/m$^2$ to the luster ink layer of the hydraulic transfer film obtained in each example, and the activator composition was made uniform with a smoothing roll. After passing through the step (a) of applying an activator to the luster ink layer, a decorative molded article was obtained by passing through the step (b) of pressing a transfer object against the hydraulic transfer film floated on a water surface, and adhering the luster ink layer to a transfer surface of the transfer object by means of a water pressure, and the film removing step (c) by water washing. The obtained decorative molded article was visually observed, and design property thereof were evaluated based on the following criteria.

(Composition of Activator Composition)

| Phthalic acid-based alkyd resin | 6 parts by mass |
| Microsilica (pigment) | 2 parts by mass |
| Dibutyl phthalate | 17 parts by mass |
| Solvent (butylcarbitol acetate) | 60 parts by mass |
| Solvent (butyl cellosolve) | 15 parts by mass |

◯: an irregularity impression corresponding to the irregularity shape of the luster ink layer was properly retained, and excellent brightness and luxuriousness could be obtained.

Δ: an irregularity impression corresponding to the irregularity shape of the luster ink, layer was slightly reduced, but was sufficiently visible, and brightness and luxuriousness that would not cause a problem in practical use could be obtained.

x: an irregularity impression corresponding to the irregularity shape of the luster ink layer disappeared, and therefore brightness and luxuriousness could not be obtained, or an irregularity shape could not be formed at: the time of producing the hydraulic transfer film.

(3) Evaluation of Transfer Processability (Followability)

In production of a decorative molded article, a columnar resin molded body having a diameter of 35 mm and a length of 250 mm was provided as a transfer object, and a hydraulic transfer film was transferred to the side surface of the resin molded body. The transfer processability (followability) of the hydraulic transfer film at this time was evaluated by visual observation.

⊙: the hydraulic transfer film properly followed the transfer object, and a decorative molded article was obtained without causing any cracking.

◯: the hydraulic transfer film had slightly poor extensibility and was slightly inferior in cracking and attaching property, but transfer processing could be performed with almost no influence on design property.

Δ: the hydraulic transfer film had slightly poor extensibility, and was inferior in cracking and attaching property, but design property were not influenced to the degree that there would be a problem in practical use.

x: the hydraulic transfer film had poor extensibility, and a significantly cracked decorative molded article was obtained, or the hydraulic transfer film could not be transferred to a transfer object because the hydraulic transfer film was cracked during hydraulic transfer.

Example 1A

A PVA film (thickness 30 μm) was provided as a water-soluble film, and a resin that forms an extension control resin layer as described in Table 1A was applied in an application amount of 3 g/m$^2$ onto one surface of the PVA film by gravure coating to form a 1 μm-thick extension control resin layer. Next, a luster ink (luster pigment: aluminum paste, average particle size: 10 μm, binder resin: mixture with a nitrocellulose resin and an alkyd resin mixed at a mass ratio of 50:20) was applied in an application amount of 2 g/m$^2$ gravure coating to thrill a 1 μm-thick luster ink layer. Embossing was then performed from the surface side of the luster ink layer at a pressure of 40 ton/in$^2$ and a temperature of 120° C. using an embossing apparatus, so that an irregularity shape having a depth of 20 μm was formed to obtain a hydraulic transfer film. Results of evaluation of shapability for the hydraulic transfer film obtained, evaluation of design property of a decorative molded article obtained using the hydraulic transfer film, and evaluation of transfer processability (followability) are shown in Table 1A.

Examples 2A to 6A and Comparative Examples 1A and 2A

Hydraulic transfer films were obtained in the same manner as in Example 1A except that resins as shown in Table 1A were used as the resin that forms an extension control resin layer in Example 1A. Results of evaluation of shapability for the hydraulic transfer films obtained, evaluation of design property of decorative molded articles obtained using the hydraulic transfer films, and evaluation of transfer processability (followability) are shown in Table 1A.

Comparative Example 3A

A hydraulic transfer film was obtained in the same manner as in Example 1A except that the extension control resin layer was not formed in Example 1A. Results of evaluation of shapability for the hydraulic transfer film obtained, evaluation of design property of a decorative molded article obtained using the hydraulic transfer film, and evaluation of transfer processability (followability) are shown in Table 1A.

TABLE 1A

| | Resin that forms extension control resin layer*[1A] | Shapability | Design property | Followability |
|---|---|---|---|---|
| Example 1A | Acrylic resin (Tg: 105° C.) | ○ | ○ | Δ |
| Example 2A | Acrylic polyol resin (Tg: 90° C.) | ○ | ○ | ○ |
| Example 3A*[2A] | Acrylic polyol resin (Tg: 90° C.) Urethane resin (Tg: 0° C.) | ○ | ○ | ⊙ |
| Example 4A*[3A] | Nitrocellulose resin (Tg: 90° C.) Alkyd resin | ○ | Δ | ⊙ |
| Example 5A*[4A] | Acrylic resin (Tg: 105° C.) Vinyl chloride-vinyl acetate copolymer resin (Tg: 70° C.) | ○ | Δ | ○ |
| Example 6A | Vinyl chloride-vinyl acetate copolymer resin (Tg: 80° C.) | ○ | Δ | ○ |
| Comparative Example 1A | Polyvinyl butyral resin (Tg: 70° C.) | X | X | ○ |
| Comparative Example 2A | Urethane resin (Tg: 0° C.) | X | X | ⊙ |
| Comparative Example 3A | — | ○ | X | ⊙ |

*[1A]the parenthesized Tg denotes a glass transition temperature.
*[2A]the mixing ratio (mass ratio) of the acrylic polyol resin and the urethane resin is 80:20.
*[3A]the mixing ratio (mass ratio) of the nitrocellulose resin and the alkyd resin is 20:10.
*[4A]the mixing ratio (mass ratio) of the acrylic resin and the vinyl chloride-vinyl acetate copolymer is 50:50.

Example 7A

In Example 3A, a luster ink layer was formed, and a mixture of a nitrocellulose resin and an alkyd resin (glass transition temperature Tg of nitrocellulose resin: 90° C.; mixing ratio (mass ratio) of nitrocellulose resin and alkyd resin: 20:10) was then applied in an application amount of 3 g/m² by gravure coating to form a 1 μm-thick second extension control resin layer. Embossing was then performed from the surface side of the second extension control resin layer at a pressure of 40 ton/m² and a temperature of 120° C. using an embossing apparatus, so that an irregularity shape having a depth of 20 μm was formed to obtain a hydraulic transfer film.

The embossed surface of the obtained hydraulic transfer film was observed, and the result showed that the irregularity shape of an embossing plate was more satisfactorily formed as compared to the hydraulic transfer films obtained in Examples 1A to 6A. Further, a decorative molded article was produced using the hydraulic transfer film. As a result, a more satisfactory design impression, and comparable of better transfer processability were obtained as compared to Examples 1A to 6A.

Example 1B

A PVA film (thickness: 30 μm²) was provided as a water-soluble film, and a luster ink (luster pigment: aluminum paste (type etc.), average particle size: 10 μm, binder resin: mixture with a nitrocellulose resin and an alkyd resin mixed at a mass ratio of 50:20) was applied onto one surface of the PVA film in an application amount of 2 g/m² by gravure coating to form a 1 μm-thick luster ink layer. Next, a resin that forms an extension control resin layer as described in Table 1B was applied in an application amount of 3 g/m² by gravure coating to form a 1 μm-thick extension control resin layer. Embossing was then performed from the surface side of the extension control resin layer at a pressure of 40 ton/m² and a temperature of 120° C. using an embossing apparatus, so that an irregularity shape having a depth of 20 μm was formed to obtain a hydraulic transfer film. Results of evaluation of shapability for the hydraulic transfer film obtained, evaluation of design property of a decorative molded article obtained using the hydraulic transfer film, and evaluation of transfer processability (followability) are shown in Table 1B.

Examples 2B to 6B and Comparative Examples 1B and 2B

Hydraulic transfer films were obtained in the same manner as in Example 1B except that resins as shown in Table 1B were used as the resin that forms an extension control resin layer in Example 1B. Results of evaluation of shapability for the hydraulic transfer films obtained, evaluation of design property of decorative molded articles obtained using the hydraulic transfer films, and evaluation of transfer processability (followability) are shown in Table 1B.

Comparative Example 3B

A hydraulic transfer film was obtained in the same manner as in Example 1B except that the extension control resin layer was not formed, and the luster ink layer was embossed in Example 1B. Results of evaluation of shapability for the hydraulic transfer film obtained, evaluation of design property of a decorative molded articles obtained using the hydraulic transfer film, and evaluation of transfer processability (followability) are shown in Table 1B.

TABLE 1B

| | Resin that forms extension control resin layer*[1B] | Shapability | Design property | Followability |
|---|---|---|---|---|
| Example 1B | Acrylic resin (Tg: 105° C.) | Δ | ○ | Δ |
| Example 2B | Acrylic polyol resin (Tg: 90° C.) | Δ | ○ | ○ |
| Example 3B*[2B] | Acrylic polyol resin (Tg: 90° C.) Urethane resin (Tg: 0° C.) | Δ | ○ | ⊙ |
| Example 4B*[3B] | Nitrocellulose resin (Tg: 90° C.) Alkyd resin | ○ | Δ | ⊙ |
| Example 5B*[4B] | Acrylic resin (Tg: 105° C.) Vinyl chloride-vinyl acetate copolymer resin (Tg: 70° C.) | Δ | Δ | ○ |
| Example 6B | Vinyl chloride-vinyl acetate copolymer resin (Tg: 80° C.) | Δ | Δ | ○ |
| Comparative Example 1B | Polyvinyl butyral resin (Tg: 70° C.) | X | X | ○ |
| Comparative Example 2B | Urethane resin (Tg: 0° C.) | X | X | ⊙ |
| Comparative Example 3B | — | ○ | X | ⊙ |

*[1B] the parenthesized Tg denotes a glass transition temperature.
*[2B] the mixing ratio (mass ratio) of the acrylic polyol resin and the urethane resin is 80:20.
*[3B] the mixing ratio (mass ratio) of the nitrocellulose resin and the alkyd resin is 20:10.
*[4B] the mixing ratio (mass ratio) of the acrylic resin and the vinyl chloride-vinyl acetate copolymer is 50:50.

Example 7B

A PVA film (thickness: 30 μm) was provided as a water-soluble film, and a luster ink (luster pigment: aluminum paste (type etc.), average particle size: 10 μm, binder resin mixture with a nitrocellulose resin and an alkyd resin mixed at a mass ratio of 50:20) was applied onto one surface of the PVA film in an application amount of 2 g/m² by gravure coating to form a 1 μm-thick luster ink layer having a solid print. Next, a resin that forms an extension control resin layer as described in Table 2B was applied in an application amount of 3 g/m² by gravure coating to form a 1 μm-thick extension control resin layer a, and further, a mixture of a nitrocellulose resin and an alkyd resin (glass transition temperature Tg of nitrocellulose resin: 90° C.; mixing ratio (mass ratio) of nitrocellulose resin and alkyd resin: 20:10) was then applied in an application amount of 3 g/m² by gravure coating to form a 1 μm-thick extension control resin layer b. Embossing was then performed from the surface side of the extension control resin layer at a pressure of 40 ton/m² and a temperature of 120° C. using an embossing apparatus, so that an irregularity shape having a depth of 20 μm was formed to obtain a hydraulic transfer film. Results of evaluation of shapability for the hydraulic transfer film obtained, evaluation of design property of a decorative molded article obtained using the hydraulic transfer film, and evaluation of transfer processability (followability) are shown in Table 2B.

Examples 8B to 12B and Comparative Examples 4B and 5B

Hydraulic transfer films were obtained in the same manner as in Example 7B except that resins as shown in Table 2B were used as the resin that forms an extension control resin layer a in Example 7B. Results of evaluation of shapability for the hydraulic transfer films obtained, evaluation of design property of decorative molded articles obtained using the hydraulic transfer films, and evaluation of transfer processability (followability) are shown in Table 2B.

TABLE 2B

| | Resin that forms extension control resin layer a*[1B] | Shapability | Design property | Followability |
|---|---|---|---|---|
| Example 7B | Acrylic resin (Tg: 105° C.) | ○ | ○ | Δ |
| Example 8B | Acrylic polyol resin (Tg: 90° C.) | ○ | ○ | ○ |
| Example 9B*[2B] | Acrylic polyol resin (Tg: 90° C.) Urethane resin (Tg: 0° C.) | ○ | ○ | ⊙ |
| Example 10B*[3B] | Nitrocellulose resin (Tg: 90° C.) Alkyd resin | ○ | Δ | ⊙ |
| Example 11B*[4B] | Acrylic resin (Tg: 105° C.) Vinyl chloride-vinyl acetate copolymer resin (Tg: 70° C.) | ○ | Δ | ○ |
| Example 12B | Vinyl chloride-vinyl acetate copolymer resin (Tg: 80° C.) | ○ | Δ | ○ |
| Comparative Example 4B | Polyvinyl butyral resin (Tg: 70° C.) | X | X | ○ |
| Comparative Example 5B | Urethane resin (Tg: 0° C.) | X | X | ⊙ |

*[1B] the parenthesized Tg denotes a glass transition temperature.
*[2B] the mixing ratio (mass ratio) of the acrylic polyol resin and the urethane resin is 80:20.
*[3B] the mixing ratio (mass ratio) of the nitrocellulose resin and the alkyd resin is 20:10.
*[4B] the mixing ratio (mass ratio) of the acrylic resin and the vinyl chloride-vinyl acetate copolymer is 50:50.

INDUSTRIAL APPLICABILITY

A hydraulic transfer film according to the present invention can provide a decorative molded article having design property with excellent brightness and luxuriousness. The obtained decorative molded article can be suitably used as a building material as well as an automobile interior material, a building material, furniture, a housing for an electric appliance, or the like.

DESCRIPTION OF REFERENCE SIGNS

10 Hydraulic transfer film
11 Water-soluble film
12 Extension control resin layer
12a Extension control resin layer a
12b Extension control resin layer b
13 Luster ink layer
14 Irregularity shape
15 Second extension resin layer
20 Decorative molded article
21 Transfer object
22 Top coat layer
23 Irregularity impression generation section

The invention claimed is:

1. A hydraulic transfer film comprising a laminated body including on a water-soluble film an extension control resin layer, and a luster ink layer containing a luster pigment and a binder resin, wherein
the hydraulic transfer film has an irregularity shape on a surface of the laminated body on a side opposite to the water-soluble film,
a resin that forms the extension control resin layer contains a resin A having a glass transition temperature of 80° C. or higher, and
wherein the irregularity shape extends to the extension control resin layer and the water-soluble film.

2. The hydraulic transfer film according to claim 1, comprising the extension control resin layer and the luster ink layer in this order on the water-soluble film.

3. The hydraulic transfer film according to claim 1, comprising the luster ink layer and the extension control resin layer in this order on the water-soluble film.

4. The hydraulic transfer film according to claim 1, wherein the glass transition temperature of the resin A is 80 to 145° C.

5. The hydraulic transfer film according to claim 1, wherein the resin A is a water-insoluble resin.

6. The hydraulic transfer film according to claim 1, wherein the resin A is at least one selected from an acrylic resin, an acrylic polyol resin, a nitrocellulose resin and a vinyl chloride-vinyl acetate copolymer resin.

7. The hydraulic transfer film according to claim 1, wherein a content of the resin A in the resin that forms the extension control resin layer is 50% by mass or more.

8. The hydraulic transfer film according to claim 1, wherein the binder resin that forms the luster ink layer is a mixture of a nitrocellulose resin and an alkyd resin.

9. The hydraulic transfer film according to claim 3, wherein the extension control layer has a multilayer structure of two or more layers.

10. The hydraulic transfer film according to claim 9, wherein a resin that forms an extension control resin layer located at the outermost surface among the extension control layers in the multilayer structure includes an alkyd resin and a nitrocellulose resin as the resin A.

11. The hydraulic transfer film according to claim 9, wherein among the extension control layers in the multilayer structure, extension control resin layers other than the extension control layer located at the outermost surface contain an acrylic polyol resin as the resin A.

12. The hydraulic transfer film according to claim 2, further comprising a second extension control resin layer, which contains the resin A, on the luster ink layer on a side opposite to the extension control resin layer.

13. The hydraulic transfer film according to claim 12, wherein the second extension control resin layer contains an alkyd resin and a nitrocellulose resin as the resin A.

14. The hydraulic transfer film according to claim 1, wherein the thickness of the extension control resin layer is 0.5 to 2.5 μm.

15. A method for producing the hydraulic transfer film of claim 1, the method comprising the following steps (1) and (2) in order:
step (1): a step of laminating on a water-soluble film an extension control resin layer formed of a resin composition containing a resin A having a glass transition temperature of 80° C. or higher, and a luster ink layer containing a luster pigment and a binder resin; and
step (2): a step of performing embossing from a surface of the laminated body on a side opposite to the water-soluble film.

16. A method for producing a decorative molded article, the method comprising the following steps (a) to (c) in order:
step (a): an activator applying step of applying, before or after floating the hydraulic transfer film according to claim 1 on a water surface with the water-soluble film facing the water surface, an activator composition to a surface of the hydraulic transfer film on a side opposite to the water-soluble film;
step (b): a step of pressing a transfer object against the activator composition-applied surface of the hydraulic transfer film subjected to the step (a) and floated on the water surface, and adhering the hydraulic transfer film to a transfer surface of the transfer object by means of a hydraulic pressure; and
step (c): a film removing step of removing the water-soluble film adhered to the transfer surface of the transfer object.

* * * * *